United States Patent
Jang et al.

(10) Patent No.: US 9,869,050 B2
(45) Date of Patent: Jan. 16, 2018

(54) DRIVING APPARATUS FOR WASHING MACHINE

(71) Applicant: NEW MOTECH CO., LTD., Gwangju (KR)

(72) Inventors: Jeong Cheol Jang, Gwangju (KR); Seong Jung Ju, Gwangju (KR); Ho Jin Jung, Gwangju (KR); Ji Min Lee, Gwangju (KR); Gyeong Sik Yang, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 279 days.

(21) Appl. No.: 14/772,383

(22) PCT Filed: Mar. 13, 2014

(86) PCT No.: PCT/KR2014/002099
§ 371 (c)(1),
(2) Date: Sep. 3, 2015

(87) PCT Pub. No.: WO2014/178531
PCT Pub. Date: Nov. 6, 2014

(65) Prior Publication Data
US 2016/0010265 A1    Jan. 14, 2016

(30) Foreign Application Priority Data

Apr. 30, 2013 (KR) .......................... 10-2013-0048589
Jul. 16, 2013 (KR) .......................... 10-2013-0083413
Jul. 16, 2013 (KR) .......................... 10-2013-0083434

(51) Int. Cl.
*H02K 7/112* (2006.01)
*D06F 37/30* (2006.01)
(Continued)

(52) U.S. Cl.
CPC .............. *D06F 37/30* (2013.01); *D06F 37/40* (2013.01); *H02K 7/112* (2013.01); *D06F 33/02* (2013.01); *D06F 2202/12* (2013.01)

(58) Field of Classification Search
CPC ....................................................... H02K 7/112
(Continued)

(56) References Cited

U.S. PATENT DOCUMENTS

| 6,176,108 B1 * | 1/2001 | Bae .......................... D06F 37/40 68/23.7 |
| 2003/0034054 A1 * | 2/2003 | Lee .......................... F16D 11/12 134/22.18 |

(Continued)

FOREIGN PATENT DOCUMENTS

| CN | 102277710 A | 12/2011 |
| CN | 202595505 U | 12/2012 |

(Continued)

OTHER PUBLICATIONS

International Search Report for PCT/KR2014/002099 dated Jun. 2, 2014 from Korean Intellectual Property Office.

*Primary Examiner* — Jeremy Luks
(74) *Attorney, Agent, or Firm* — Revolution IP, PLLC

(57) ABSTRACT

A driving apparatus for a washing machine including: a housing; a brake drum rotatably disposed inside the housing; a dewatering shaft coupled to the brake drum; a washing shaft rotatably disposed inside the dewatering shaft; a rotor to which the washing shaft is coupled; a stator disposed inside the rotor; a brake lever disposed on the outer peripheral surface of the housing and adapted to operate a brake pad connected to one end thereof to control the rotation of the brake drum; a coupling clutch moved upwardly and downwardly along a lower end portion of the dewatering shaft; a clutch lever mounted on the housing and rotating upon the rotation of the brake lever to move the coupling clutch upwardly and downwardly; and a pressurizing lever
(Continued)

coupled to the brake lever to rotate together with the brake lever and to push and rotate the clutch lever.

11 Claims, 4 Drawing Sheets

(51) Int. Cl.
*D06F 37/40* (2006.01)
*D06F 33/02* (2006.01)

(58) Field of Classification Search
USPC .......................................................... 310/78
See application file for complete search history.

(56) References Cited

U.S. PATENT DOCUMENTS

| | | | | |
|---|---|---|---|---|
| 2005/0081573 | A1* | 4/2005 | Han | D06F 37/304 68/12.02 |
| 2005/0166643 | A1 | 8/2005 | Cho et al. | |
| 2005/0223754 | A1* | 10/2005 | Choi | D06F 37/40 68/3 R |
| 2006/0075789 | A1* | 4/2006 | Lee | D06F 37/40 68/12.24 |
| 2009/0229312 | A1* | 9/2009 | Chung | D06F 39/083 68/12.19 |
| 2013/0036773 | A1 | 2/2013 | Choi et al. | |
| 2014/0069145 | A1* | 3/2014 | Chupka | H02K 7/108 68/12.24 |

FOREIGN PATENT DOCUMENTS

| | | |
|---|---|---|
| JP | 2001-340685 A | 12/2001 |
| JP | 2006-517126 A | 7/2006 |
| KR | 10-0593636 B1 | 6/2006 |
| KR | 10-2013-0017882 A | 2/2013 |

* cited by examiner

[Fig. 1]
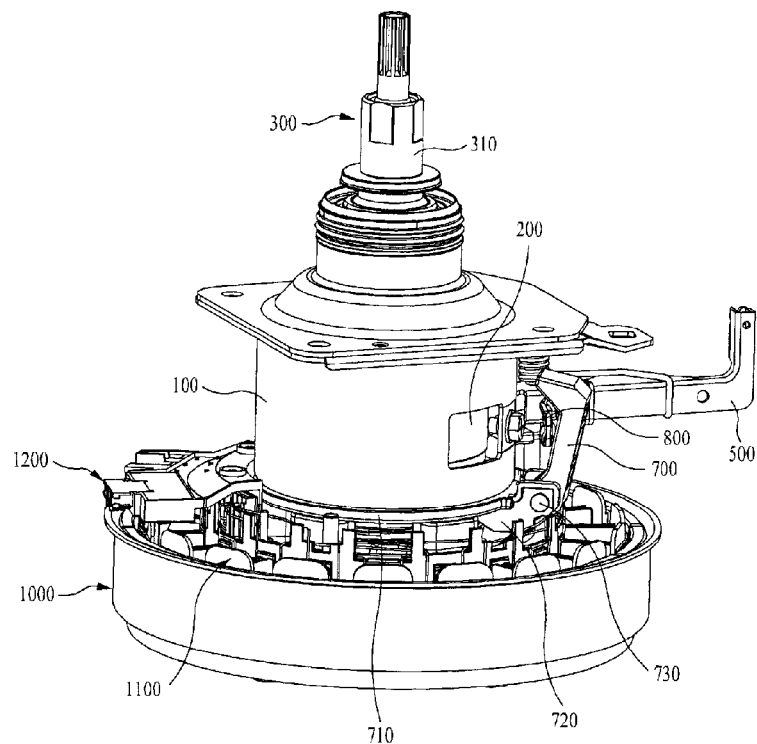
[Fig. 2]
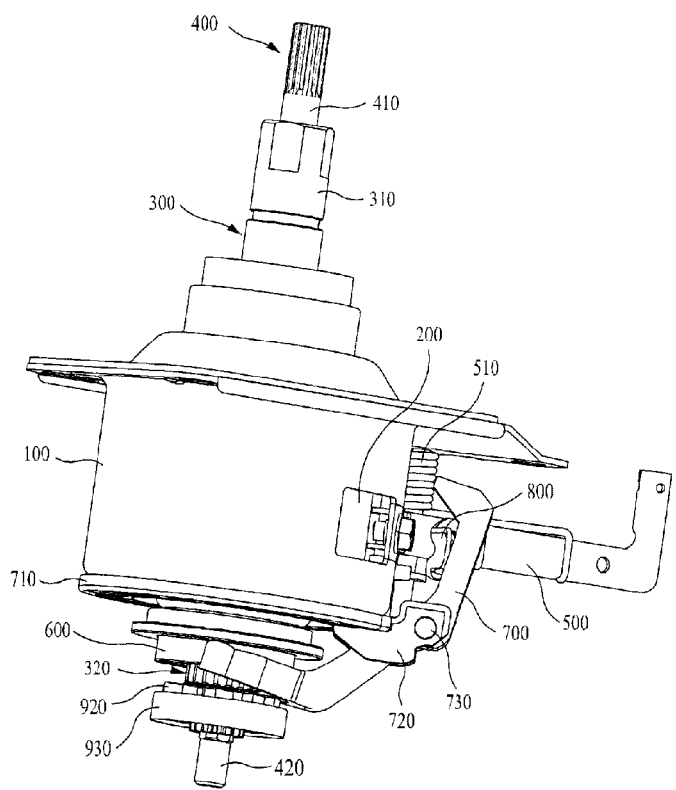

[Fig. 3]
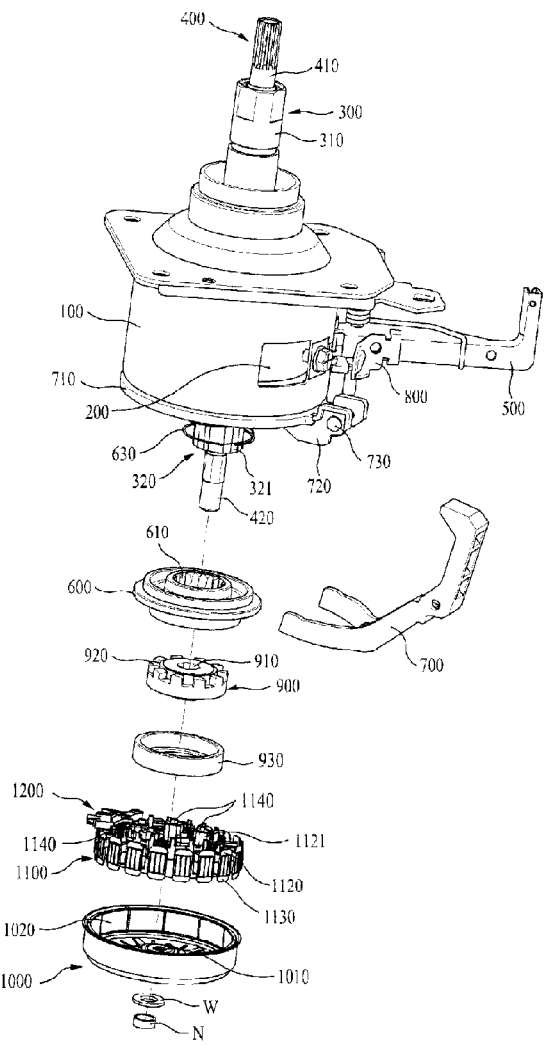
[Fig. 4]
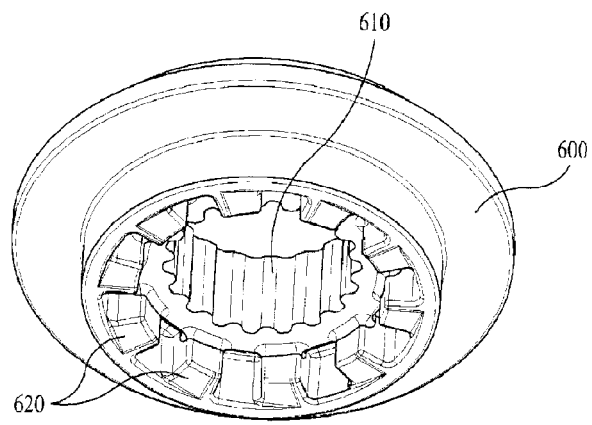

[Fig. 5]
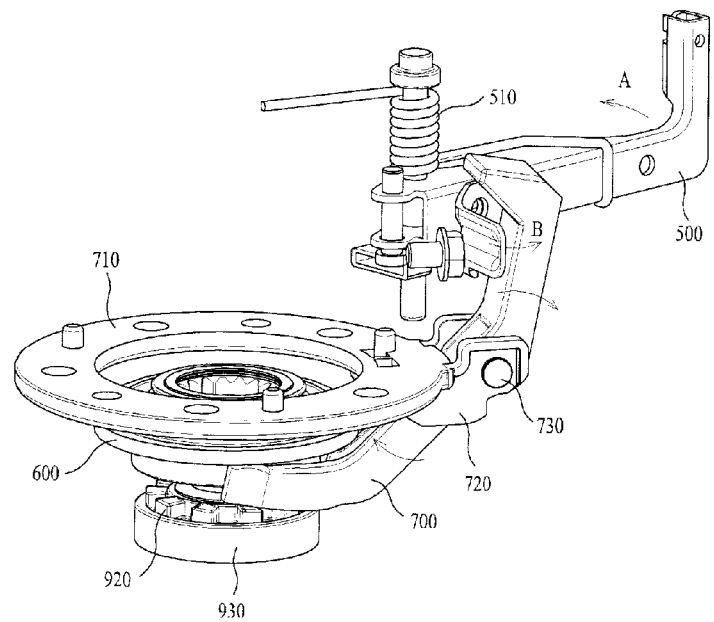
[Fig. 6]
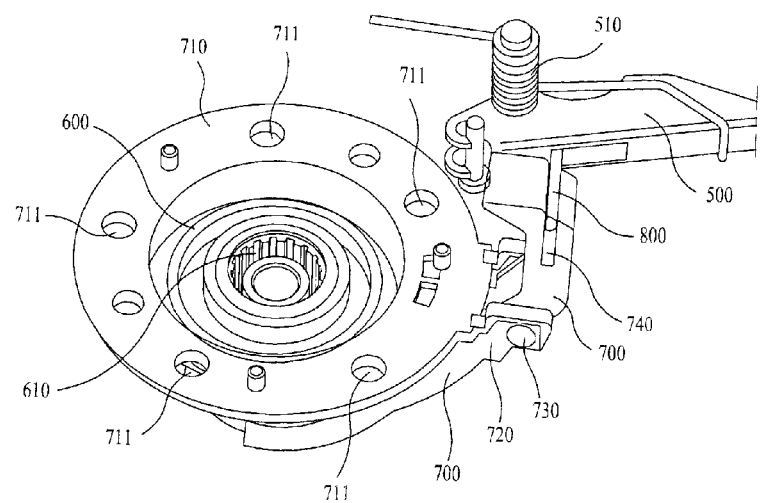

[Fig. 7]
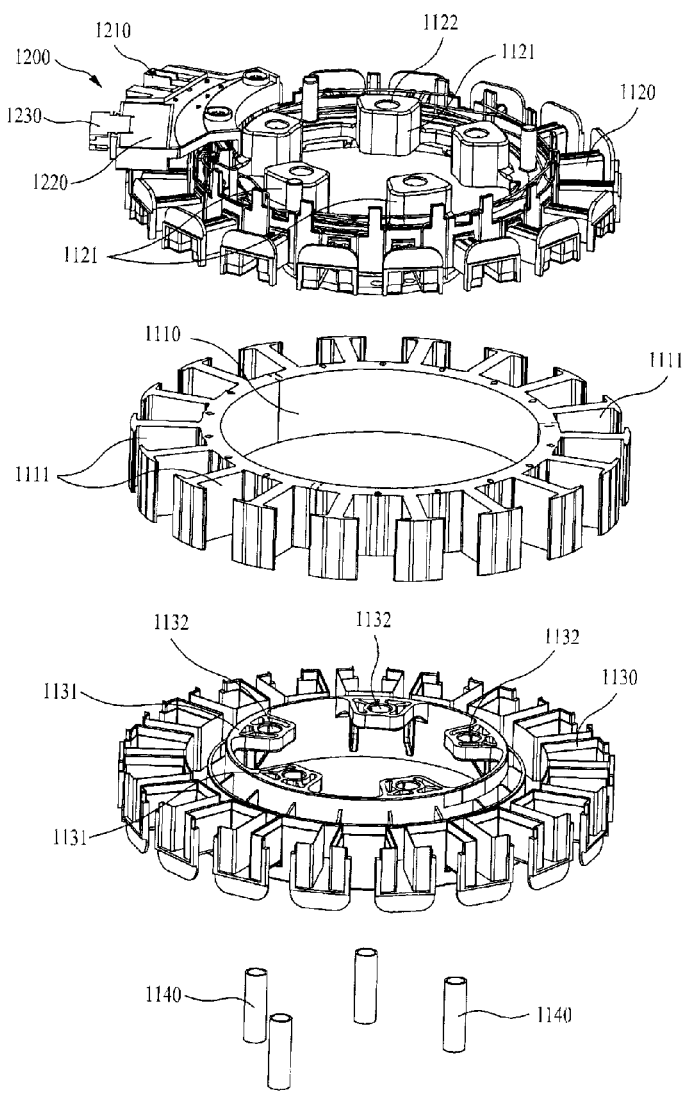

DRIVING APPARATUS FOR WASHING MACHINE

CROSS REFERENCE TO PRIOR APPLICATIONS

This application is a National Stage Application of PCT International Patent Application No. PCT/KR2014/002099 filed on Mar. 13, 2014, under 35 U.S.C. §371, which claims priority to Korean Patent Application Nos. 10-2013-0048589 filed on Apr. 30, 2013, 10-2013-0083413 filed on Jul. 16, 2013, and 10-2013-0083434 filed on Jul. 16, 2013, which are all hereby incorporated by reference in their entirety.

TECHNICAL FIELD

The present invention relates to a driving apparatus for a washing machine, and more particularly, to a driving apparatus for a washing machine that is capable of being simple in the whole configuration, thus reducing the manufacturing cost and effectively performing power transmission.

BACKGROUND ART

Generally, a washing machine is an electronic appliance that removes the pollutants from clothes, bedding and the like through the friction and impacts of the flow of water caused by the emulsification of detergent and the rotation of washing wings, and the washing process of the washing machine generally has washing, rinsing, dewatering and water supplying/discharging strokes.

The washing machine is largely classified into a pulsator type washing machine and a drum type washing machine in accordance with washing ways, and the pulsator type washing machine rotates only the washing wings to form the flow of water in the state where the washing tub stops at the time of the washing and rinsing strokes and rotates the washing wings and the washing tub together at the time of the dewatering stroke to perform the dewatering stroke from the laundry put into the washing tub by using a centrifugal force.

Typically, the washing machine includes a washing shaft adapted to rotate the washing wings, a dewatering shaft adapted to rotate the washing tub, a clutch unit adapted to selectively transmit a driving force of a motor to the washing shaft and the dewatering shaft in accordance with the washing mode, and a brake unit adapted to fix the washing tub at the time of the washing stroke.

The clutch unit is operated by means of a clutch motor and selectively transmits the driving force of the motor to the washing shaft and the dewatering shaft, and the brake unit is operated by means of a brake motor to allow a brake pad to fix a brake drum thereto, so that the washing tub can be kept fixed at the time of the washing stroke.

According to the conventional washing machine, however, the clutch unit and the brake unit are operated independently of each other by means of their respective motors, thus making the driving apparatus more complicated in configuration, and further, such motors are needed, thus making the volume bulky and raising the manufacturing cost.

DISCLOSURE OF INVENTION

Technical Problem

Accordingly, the present invention has been made in view of the above-mentioned problems occurring in the prior art, and it is an object of the present invention to provide a driving apparatus for a washing machine that can be configured wherein when a brake lever rotates, a pressurizing lever rotates together with the brake lever to rotate a clutch lever, so that no separate clutch motor for driving the clutch lever is needed, thus being compacted in configuration.

It is another object of the present invention to provide a driving apparatus for a washing machine that can be configured wherein a clutch lever rotates by means of the driving force applied to a brake lever, thus effectively performing the power transmission and further becoming simple in configuration to reduce the manufacturing cost.

Solution to Problem

To accomplish the above-mentioned objects, according to a first aspect of the present invention, there is provided a driving apparatus for a washing machine including: a housing; a brake drum rotatably disposed inside the housing; a dewatering shaft coupled to the brake drum; a washing shaft rotatably disposed inside the dewatering shaft; a rotor to which a lower end portion of the washing shaft is coupled and rotating if power is applied thereto; a stator disposed inside the rotor and having a stator core and upper and lower insulators coupled to each other to surround the upper and lower portions of the stator core; a brake lever disposed on the outer peripheral surface of the housing in such a manner as to rotate by means of a brake motor and adapted to operate a brake pad connected to one end thereof to control the rotation of the brake drum; a coupling clutch moved upwardly and downwardly along a lower end portion of the dewatering shaft in such a manner as to be coupled to the dewatering shaft at the time of being moved upwardly and coupled to the dewatering shaft and the rotor at the time of being moved downwardly; a clutch lever mounted on the housing so as to support the lower peripheral surface of the coupling clutch and rotating upon the rotation of the brake lever to move the coupling clutch upwardly and downwardly; and a pressurizing lever coupled to the brake lever in such a manner as to rotate together with the brake lever and thus to push and rotate the clutch lever.

According to the present invention, preferably, the clutch lever comprises a coupling stopper fixedly mounted on the underside of the housing and a bracket mounted at one side of the coupling stopper so as to fixedly insert the end portion of the clutch lever thereinto by means of a hinge.

According to the present invention, preferably, the dewatering shaft has a first outer spline formed along the outer peripheral surface of the lower end portion thereof, and the coupling clutch has a first inner spline formed along the inner peripheral surface thereof in such a manner as to be engaged with the first outer spline.

According to the present invention, preferably, a shaft coupler is fixedly mounted at the rotor in such a manner as to be spline-coupled to the coupling clutch.

According to the present invention, preferably, the shaft coupler has a second outer spline formed along the outer peripheral surface of the top end portion thereof, and the coupling clutch has a second inner spline formed along the inner peripheral surface of the lower end portion thereof in such a manner as to be engaged with the second outer spline.

According to the present invention, preferably, the shaft coupler is disposed in the rotor in the state of being surrounded with a cylindrical clutch boss, so as to allow the second outer spline of the shaft coupler to be stably engaged with the second inner spline of the coupling clutch.

According to the present invention, preferably, the clutch lever has an incised groove formed on the top end portion thereof so as to insert the pressurizing lever thereinto.

According to the present invention, preferably, the stator is coupled to the underside of the coupling stopper.

According to the present invention, preferably, the upper insulator has a plurality of first flanges protrudedly formed spaced apart from each other by a given distance along the inner peripheral surface of the central portion thereof, each first flange having a first fastening hole formed thereon, the lower insulator has a plurality of second flanges protrudedly formed spaced apart from each other by a given distance along the inner peripheral surface of the central portion thereof, each second flange having a second fastening hole formed thereon in such a manner as to communicate with the corresponding first fastening hole, and the coupling stopper has a plurality of third fastening holes formed thereon so as to insert top end portions of a plurality of bushes thereinto, the plurality of bushes being inserted into the first and second fastening holes.

According to the present invention, preferably, a distance between one pair of first flanges and a distance between one pair of second flanges at which the clutch lever is located when the upper and lower insulators are coupled to the underside of the coupling stopper are longer than the distances between other pairs of first and second flanges so as to prevent the occurrence of interference upon the rotation of the clutch lever.

According to the present invention, preferably, the upper insulator has a hall sensor disposed on one side of the top surface thereof, the hall sensor comprising a power connector connected to external power, a position sensor adapted to sense the positions of a plurality of magnets attached to the inner peripheral surface of the rotor, and a signal transmitter connected to a controller to transmit the sensed signal from the position sensor to the controller.

To accomplish the above-mentioned objects, according to a second aspect of the present invention, there is provided a driving apparatus for a washing machine including: a housing; a dewatering shaft rotatably disposed inside the housing; a washing shaft rotatably disposed inside the dewatering shaft; a rotor to which a lower end portion of the washing shaft and rotating if power is applied thereto; a coupling clutch moved upwardly and downwardly along a lower end portion of the dewatering shaft in such a manner as to be coupled to the dewatering shaft at the time of being moved upwardly and coupled to the dewatering shaft and the rotor at the time of being moved downwardly; a coupling stopper fixedly mounted on the underside of the housing; a stator coupled to the underside of the coupling stopper in such a manner as to be disposed inside the rotor and having a stator core and upper and lower insulators coupled to each other to surround the upper and lower portions of the stator core; and a clutch lever rotatably mounted on one side of the coupling stopper and adapted to support the lower peripheral surface of the coupling clutch in such a manner as to move the coupling clutch upwardly and downwardly.

According to the present invention, preferably, the clutch lever has a bracket fixedly mounted at one side of the coupling stopper so as to fixedly insert the end portion of the clutch lever thereinto by means of a hinge.

According to the present invention, preferably, the upper insulator has a plurality of first flanges protrudedly formed spaced apart from each other by a given distance along the inner peripheral surface of the central portion thereof, each first flange having a first fastening hole formed thereon, the lower insulator has a plurality of second flanges protrudedly formed spaced apart from each other by a given distance along the inner peripheral surface of the central portion thereof, each second flange having a second fastening hole formed thereon in such a manner as to communicate with the corresponding first fastening hole, and the coupling stopper has a plurality of third fastening holes formed thereon so as to insert top end portions of a plurality of bushes thereinto, the plurality of bushes being inserted into the first and second fastening holes.

According to the present invention, preferably, a distance between one pair of first flanges and a distance between one pair of second flanges at which the clutch lever is located when the upper and lower insulators are coupled to the underside of the coupling stopper are longer than the distances between other pairs of first and second flanges so as to prevent the occurrence of interference upon the rotation of the clutch lever.

According to the present invention, preferably, the upper insulator has a hall sensor disposed on one side of the top surface thereof, the hall sensor comprising a power connector connected to external power, a position sensor adapted to sense the positions of a plurality of magnets attached to the inner peripheral surface of the rotor, and a signal transmitter connected to a controller to transmit the sensed signal from the position sensor to the controller.

Advantageous Effects of Invention

According to the present invention, the driving apparatus for a washing machine is configured wherein when the brake lever rotates, the pressurizing lever rotates together with the brake lever to rotate the clutch lever, so that no separate clutch motor for driving the clutch lever is needed, thus being compacted in configuration.

Further, the driving apparatus for a washing machine is configured wherein the clutch lever rotates by means of the driving force applied to the brake lever, thus effectively performing the power transmission and further becoming simple in configuration to reduce the manufacturing cost.

BRIEF DESCRIPTION OF DRAWINGS

FIG. 1 is a perspective view showing the whole configuration of a driving apparatus for a washing machine according to the present invention.

FIG. 2 is a perspective view showing the coupled structure of a coupling clutch in the driving apparatus for a washing machine according to the present invention.

FIG. 3 is an exploded perspective view showing the driving apparatus for a washing machine according to the present invention.

FIG. 4 is a perspective view showing the lower portion of the coupling clutch in the driving apparatus for a washing machine according to the present invention.

FIG. 5 is a perspective view showing the state where a clutch lever is rotated by means of a pressurizing lever in the driving apparatus for a washing machine according to the present invention.

FIG. 6 is a perspective view showing another structure of the pressurizing lever in the driving apparatus for a washing machine according to the present invention.

FIG. 7 is an exploded perspective view showing a stator in the driving apparatus for a washing machine according to the present invention.

MODE FOR THE INVENTION

Hereinafter, an explanation on a driving apparatus for a washing machine according to the present invention will be in detail given with reference to the attached drawings. In the description of the present invention, the same parts in the drawings are indicated by identical reference numerals to each other, and therefore, an explanation on them will be avoided separately for the brevity of the description.

FIG. 1 is a perspective view showing the whole configuration of a driving apparatus for a washing machine according to the present invention, FIG. 2 is a perspective view showing the coupled structure of a coupling clutch in the driving apparatus for a washing machine according to the present invention, and FIG. 3 is an exploded perspective view showing the driving apparatus for a washing machine according to the present invention.

As shown in FIGS. 1 to 3, a driving apparatus for a washing machine according to the present invention largely includes a housing 100, a brake drum 200, a dewatering shaft 300, a washing shaft 400, a brake lever 500, a coupling clutch 600, a clutch lever 700, a pressurizing lever 800, a rotor 1000, and a stator 1100.

The housing 100 serves to protect all kinds of parts like the brake drum 200 disposed at the interior thereof from external impacts and is fixed to the underside of a washing tub (not shown) by means of fastening means like bolts.

The brake drum 200 is rotatably disposed inside the housing 100 and has planetary gears (not shown) mounted at the inside thereof so as to reduce the rotation speed of a motor (not shown) of the washing machine and thus to transmit the reduced speed to the washing shaft 400.

The dewatering shaft 300 is coupled to the brake drum 200, rotates together with the brake drum 200 at the time of a dewatering stroke, and thus rotates the washing tub coupled to the top end periphery thereof.

The washing shaft 400 is rotatably disposed inside the dewatering shaft 300 by means of a bearing (not shown). The washing shaft 400 has a top end portion 410 coupled to washing wings (not shown) and a bottom end portion 420 coupled to the rotor 1000 as will be discussed later constituting the motor of the washing machine. If power is applied to the motor of the washing machine to rotate the rotor 1000, accordingly, a rotational force generated from the rotor 1000 is transmitted to the washing wings, and thus, the washing wings rotate.

The brake lever 500 is mounted at the outer peripheral surface of the housing 100 and serves to rotate by means of the driving force generated from a brake motor (not shown) and operate a brake pad (not shown) connected to one end thereof to brake the brake drum 200.

In more detail, the brake lever 500 rotates by means of the brake motor at the time of a washing stroke, thus allowing the brake pad to pressurize and fix the brake drum 200 thereto, and if the brake motor stops at the time of the dewatering stroke, the brake lever 500 is returned to its original position by means of an elastic force of a spring 510, thus allowing the brake pad to be separated from the brake drum 200 and further rotating the dewatering shaft 300 together with the brake drum 200.

The coupling clutch 600 is moved upwardly and downwardly along the lower end portion 320 of the dewatering shaft 300 and coupled to only the dewatering shaft 300 or to both of the dewatering shaft 300 and the rotor 1000 in accordance with washing modes.

In more detail, the coupling clutch 600 is moved upwardly at the time of the washing stroke in such a manner as to be coupled to only the lower end portion 320 of the dewatering shaft 300, and moved downwardly at the time of the dewatering stroke in such a manner as to be coupled to both of the dewatering shaft 300 and the rotor 1000.

The coupling clutch 600 is spline-coupled to the lower end portion 320 of the dewatering shaft 300 so as to transmit the torque of the rotor 1000 to the dewatering shaft 300 and at the same time to be moved upwardly and downwardly along the dewatering shaft 300. Accordingly, the dewatering shaft 300 has a first outer spline 321 formed along the outer peripheral surface of the lower end portion 320, and the coupling clutch 600 has a first inner spline 610 formed along the inner peripheral surface thereof in such a manner as to be engaged with the first outer spline 321.

On the other hand, a shaft coupler 900 is fixedly mounted at the rotor 1000 in such a manner as to be spline-coupled to the coupling clutch 600, so that the coupling clutch 600 can receive the torque of the rotor 1000.

FIG. 4 is a perspective view showing the lower portion of the coupling clutch in the driving apparatus for a washing machine according to the present invention.

The shaft coupler 900 has a through hole 910 formed at the center thereof, through which the lower end portion 420 of the washing shaft 400 is insertedly passed, and has a second outer spline 920 formed along the outer peripheral surface of the top end portion thereof in such a manner as to be engaged with a second inner spline 620 (see FIG. 4) formed along the inner peripheral surface of the lower end portion of the coupling clutch 600.

Accordingly, the lower end portion 420 of the washing shaft 400 is passed through the through hole 910 of the shaft coupler 900 and inserted into a coupling hole 1010 formed at the center of the rotor 1000. After that, if the lower end portion 420 of the washing shaft 400 is fixed to the rotor 1000 by means of a nut N and a washer W, the rotational force of the rotor 1000 is naturally transmitted to the washing shaft 400 and the shaft coupler 900. In this state, if the coupling clutch 600 is moved upwardly at the time of the washing stroke and thus separated from the shaft coupler 900, the rotational force of the rotor 1000 is transmitted to only the washing shaft 400, and contrarily, if the coupling clutch 600 is moved downwardly at the time of the dewatering stroke to allow the second inner spline 620 to be engaged with the second outer spline 920 of the shaft coupler 900, the rotational force of the rotor 1000 is transmitted through the shaft coupler 900 to the coupling clutch 600, thus rotating the dewatering shaft 300 coupled to the coupling clutch 600.

In this case, the shaft coupler 900 is disposed in the rotor 1000 in the state of being surrounded with a cylindrical clutch boss 930, so as to allow the second outer spline 920 of the shaft coupler 900 to be stably engaged with the second inner spline 620 of the coupling clutch 600.

The clutch lever 700 is mounted on the housing 100 so as to support the lower peripheral surface of the coupling clutch 600 and pushed and rotated by means of the pressurizing lever 800 as will be discussed below at the time of the rotation of the brake lever 500 so as to move the coupling clutch 600 upwardly and downwardly along the lower end portion 320 of the dewatering shaft 300.

So as to mount the clutch lever 700 on the housing 100, a coupling stopper 710 is fixedly mounted on the underside of the housing 100, and a bracket 720 is mounted at one side of the coupling stopper 710 so as to fixedly insert the end portion of the clutch lever 700 thereinto by means of a hinge 730.

If an external force is applied to the clutch lever 700, accordingly, the clutch lever 700 is rotated around the hinge 730, and at this time, the lower end portion of the clutch lever 700 supporting the lower peripheral surface of the coupling clutch 600 is rotated upwardly and downwardly, thus moving the coupling clutch 600 upwardly and downwardly.

In this case, if the clutch lever 700 is rotated in the direction of upwardly pushing the lower peripheral surface of the coupling clutch 600, the coupling between the coupling clutch 600 and the rotor 1000, that is, the shaft coupler 900 is released so that the rotational force of the rotor 1000 is transmitted to only the washing shaft 400, thus rotating the washing wings coupled to the top end portion 410 of the washing shaft 400 within the washing tub.

Further, if the clutch lever 700 is rotated in the opposite direction to the above-mentioned direction, the coupling clutch 600 is moved downwardly along the lower end portion 320 of the dewatering shaft 300 and coupled to the lower end portion 320 of the dewatering shaft 300 and the shaft coupler 900 at the same time, so that the rotational force of the rotor 1000 is transmitted to the dewatering shaft 300 through the shaft coupler 900, thus rotating the dewatering shaft 300.

In this case, the downward movement of the coupling clutch 600 is conducted by means of a pressuring spring 630 mounted inside the coupling clutch 600 in such a manner as to surround the outer peripheral surface of the lower end portion 320 of the dewatering shaft 300.

When the coupling clutch 600 upwardly pushes by means of the clutch lever 700 and thus moves upwardly along the lower end portion 320 of the dewatering shaft 300, in more detail, the pressurizing spring 630 becomes contracted, and if the external force of the clutch lever 700 applied to the coupling clutch 600 is removed, the pressurizing spring 630 is expanded by means of its elastic force to downwardly push the coupling clutch 600, thus allowing the coupling clutch 600 to be moved downwardly along the lower end portion 320 of the dewatering shaft 300.

The pressurizing lever 800 is coupled to the brake lever 500 and when the brake lever 500 rotates, the pressurizing lever 800 rotates together with the brake lever 500 to rotate the clutch lever 700.

FIG. 5 is a perspective view showing the state where the clutch lever is rotated by means of the pressurizing lever in the driving apparatus for a washing machine according to the present invention.

In more detail, as shown in FIG. 5, when the brake lever 500 is rotated in the counter-clockwise direction of A by means of the brake motor at the time of the washing stroke, the pressurizing lever 800 is rotated in the clockwise direction of B together with the brake lever 500 to push the clutch lever 700 outwardly, so that the clutch lever 700 is rotated around the hinge 730.

If the clutch lever 700 is rotated by means of the pressurizing lever 800, as mentioned above, the coupling clutch 600 is naturally pushed upwardly by means of the clutch lever 700 and moved upwardly along the lower end portion 320 of the dewatering shaft 300, thus allowing the coupling clutch 600 to be separated from the shaft coupler 900.

If the brake motor stops at the time of the dewatering stroke, further, the brake lever 500 and the pressuring lever 800 are rotated in the clockwise direction by means of the elastic force of the spring 510 and thus returned to their original position. At the same time, the coupling clutch 600 is moved downwardly along the lower end portion 320 of the dewatering shaft 300 by means of the elastic force of the pressurizing spring 630, thus allowing the lower end portion 320 of the dewatering shaft 300 to be coupled to the shaft coupler 900.

FIG. 6 is a perspective view showing another structure of the pressurizing lever in the driving apparatus for a washing machine according to the present invention.

As mentioned above, the pressurizing lever 800 is disposed contacted with the front surface of the clutch lever 700, as shown in FIG. 5, so as to rotate the clutch lever 700, but as shown in FIG. 6, the pressurizing lever 800 is insertedly disposed into an incised groove 740 formed on the top end portion of the clutch lever 700.

In this case, the pressurizing lever 800 is inserted into the incised groove 740 in such a manner as to be contacted with the inner surface of the clutch lever 700, so that the clutch lever 700 can be more stably rotated by means of the pressurizing lever 800 at the time of the washing and dewatering strokes.

As described above, the rotor 1000 has the coupling hole 1010 formed on the center thereof, through which the lower end portion 420 of the washing shaft 400 is insertedly passed, and has a plurality of magnets 1020 attached along the inner peripheral surface thereof in such a manner as to have an electromagnetic cooperative operation with the coils wound around a plurality of teeth 1111 as will be discussed below.

FIG. 7 is an exploded perspective view showing the stator in the driving apparatus for a washing machine according to the present invention.

The stator 1100 is disposed inside the rotor 1000 in such a manner as to be surrounded with the rotor 1000. As shown in FIG. 7, the stator 1100 has a stator core 1110 and upper and lower insulators 1120 and 1130.

The stator core 1110 is formed by laminating silicon steel plates onto each other and has the plurality of teeth 1111 formed along the outer peripheral surface thereof, along which the coils (not shown) are wound.

The upper and lower insulators 1120 and 1130 are coupled to each other to surround the upper and lower portions of the stator core 1110, thus preventing the coils wound around the plurality of teeth 1111 from being directly contacted with the stator core 1110.

In more detail, the upper and lower insulators 1120 and 1130 serve to prevent the coils wound around the plurality of teeth 1111, to which an electric current is applied, from being directly contacted with the inner peripheral surface of the stator core 1110.

The upper and lower insulators 1120 and 1130 are made of synthetic resin like polyacetal, polyoxymethylene and so on, and they are separately made and coupled to the stator core 1110. Otherwise, they may be integrally formed with the stator core 1110 by means of insert molding.

On the other hand, the stator 1110 is coupled to the underside of the coupling stopper 710. So as to perform the coupling, the upper insulator 1120 has a plurality of first flanges 1121 protrudedly formed spaced apart from each other by a given distance along the inner peripheral surface of the central portion thereof, each first flange 1121 having a first fastening hole 1122 formed thereon, and further, the lower insulator 1130 has a plurality of second flanges 1131 protrudedly formed spaced apart from each other by a given distance along the inner peripheral surface of the central portion thereof, each second flange 1131 having a second fastening hole 1132 formed thereon in such a manner as to communicate with the corresponding first fastening hole 1122. Furthermore, as shown in FIG. 6, the coupling stopper 710 has a plurality of third fastening holes 711 formed thereon, into which top end portions of a plurality of bushes 1140 are inserted, the plurality of bushes 1140 being inserted into the first and second fastening holes 1122 and 1132.

Accordingly, if the bushes 1140 are pushed into the first and second fastening holes 1122 and 1132 of the first and second flanges 1121 and 1131, the top end portions of the bushes 1140 are passed through the first and second fastening holes 1122 and 1132 and thus inserted into the third fastening holes 711 formed on the coupling stopper 710, thus allowing the upper and lower insulators 1120 and 1130 to be coupled to the underside of the coupling stopper 710 and further allowing the stator 1110 to be naturally coupled to the underside of the coupling stopper 710.

On the other hand, the plurality of first flanges 1121 is protrudedly formed spaced apart from each other by a given distance along the inner peripheral surface of the upper insulator 1120, and the plurality of second flanges 1131 is protrudedly formed spaced apart from each other by a given distance along the inner peripheral surface of the lower insulator 1130.

As shown in FIG. 7, in case where five first and second flanges 1121 and 1131 are formed along the inner peripheral surfaces of the upper and lower insulators 1120 and 1130, they can be equally spaced apart from each other along the inner peripheral surfaces of the upper and lower insulators 1120 and 1130.

However, if the upper and lower insulators 1120 and 1130 are coupled to the coupling stopper 710 by means of the bushes 1140, the clutch lever 700 is rotated naturally inside the upper and lower insulators 1120 and 1130, and accordingly, a distance L between one pair of first flanges 1121 and a distance L between one pair of second flanges 1131 at which the clutch lever 700 is located are desirably longer than those between other pairs of first and second flanges 1121 and 1131, so that no interference occurs upon the rotation of the clutch lever 700.

On the other hand, the upper insulator 1120 has a hall sensor 1200 disposed on one side of the top surface thereof, and the hall sensor 1200 has a power connector 1210 connected to external power, a position sensor 1220 adapted to sense the positions of the magnets 1020 attached to the inner peripheral surface of the rotor 1000, and a signal transmitter 1230 connected to a controller (not shown) to transmit the sensed signal from the position sensor 1220 to the controller.

The hall sensor 1200 serves to supply the external power fed through the power connector 1210 to the coils wound around the teeth 1111 of the stator core 1110, and, if the positions of the magnets 1020 attached to the inner peripheral surface of the rotor 1000 are sensed by means of the position sensor 1220, serves to transmit the sensed signal to the controller, thus controlling the rotation of the rotor 1000 by means of the controller.

As described above, the driving apparatus for the washing machine according to the present invention is configured wherein when the brake lever 500 rotates, the pressurizing lever 800 rotates together with the brake lever 500 to rotate the clutch lever 700, so that the clutch motor used for driving the clutch lever 700 in the conventional practice is not needed at all, thus being compacted in configuration. Further, the clutch lever 700 rotates by means of the driving force applied to the brake lever 500, thus effectively performing the power transmission.

While the present invention will be described with reference to the particular illustrative embodiments, it is not to be restricted by the embodiment but only by the appended claims. It is to be appreciated that those skilled in the art can change or modify the embodiments without departing from the scope and spirit of the present invention.

The invention claimed is:

1. A driving apparatus for a washing machine, comprising:
    a housing;
    a brake drum rotatably disposed inside the housing;
    a dewatering shaft coupled to the brake drum;
    a washing shaft rotatably disposed inside the dewatering shaft;
    a rotor to which a lower end portion of the washing shaft is coupled and rotating if power is applied thereto;
    a stator disposed inside the rotor and having a stator core and upper and lower insulators coupled to each other to surround the upper and lower portions of the stator core;
    a brake lever disposed on the outer peripheral surface of the housing in such a manner as to rotate by means of a brake motor and adapted to operate a brake pad connected to one end thereof to control the rotation of the brake drum;
    a coupling clutch moved upwardly and downwardly along a lower end portion of the dewatering shaft in such a manner as to be coupled to the dewatering shaft at the time of being moved upwardly and coupled to the dewatering shaft and the rotor at the time of being moved downwardly;
    a clutch lever rotatably mounted on the housing by a hinge and including a lower end portion which supports the lower peripheral surface of the coupling clutch and an upper end portion which is positioned adjacent to the brake lever, wherein on the rotation of the brake lever by the brake motor, the lower end portion of the clutch lever rotates upwardly and moves the coupling clutch upwardly along the lower end portion of the dewatering shaft; and
    a pressurizing lever coupled to the brake lever and rotating together with the brake lever, wherein on the rotation of the brake lever by the brake motor, the pressurizing lever pushing the upper end portion of the clutch lever outwardly to rotate the lower end portion of the clutch lever upwardly.

2. The driving apparatus for a washing machine according to claim 1, the driving apparatus further comprises a coupling stopper fixedly mounted on the underside of the housing and a bracket mounted at one side of the coupling stopper so as to insert the clutch lever thereinto by means of the hinge.

3. The driving apparatus for a washing machine according to claim 1, wherein the dewatering shaft has a first outer spline formed along the outer peripheral surface of the lower end portion thereof, and the coupling clutch has a first inner spline formed along the inner peripheral surface thereof in such a manner as to be engaged with the first outer spline.

4. The driving apparatus for a washing machine according to claim 1, wherein a shaft coupler is fixedly mounted at the rotor in such a manner as to be spline-coupled to the coupling clutch.

5. The driving apparatus for a washing machine according to claim 4, wherein the shaft coupler has a second outer spline formed along the outer peripheral surface of the top end portion thereof, and the coupling clutch has a second inner spline formed along the inner peripheral surface of the lower end portion thereof in such a manner as to be engaged with the second outer spline.

6. The driving apparatus for a washing machine according to claim 5, wherein the shaft coupler is disposed in the rotor in the state of being surrounded with a cylindrical clutch boss, so as to allow the second outer spline of the shaft coupler to be stably engaged with the second inner spline of the coupling clutch.

7. The driving apparatus for a washing machine according to claim 1, wherein the clutch lever has an incised groove formed on the top end portion thereof so as to insert the pressurizing lever thereinto.

8. The driving apparatus for a washing machine according to claim 2, wherein the stator is coupled to the underside of the coupling stopper.

9. The driving apparatus for a washing machine according to claim 8, wherein the upper insulator has a plurality of first flanges protrudedly formed spaced apart from each other by a given distance along the inner peripheral surface of the central portion thereof, each first flange having a first fastening hole formed thereon, the lower insulator has a plurality of second flanges protrudedly formed spaced apart from each other by a given distance along the inner peripheral surface of a central portion thereof, each second flange having a second fastening hole formed thereon in such a manner as to communicate with the corresponding first fastening hole, and the coupling stopper has a plurality of third fastening holes formed thereon so as to insert top end portions of a plurality of bushes thereinto, the plurality of bushes being inserted into the first and second fastening holes.

10. The driving apparatus for a washing machine according to claim 9, wherein a distance between one pair of first flanges and a distance between one pair of second flanges at which the clutch lever is located when the upper and lower insulators are coupled to the underside of the coupling stopper are longer than the distances between other pairs of first and second flanges so as to prevent the occurrence of interference upon the rotation of the clutch lever.

11. The driving apparatus for a washing machine according to claim 1, wherein the upper insulator has a hall sensor disposed on one side of the top surface thereof, the hall sensor comprising a power connector connected to external power, a position sensor adapted to sense the positions of a plurality of magnets attached to the inner peripheral surface of the rotor, and a signal transmitter connected to a controller to transmit the sensed signal from the position sensor to the controller.

* * * * *